(12) United States Patent
Norrie

(10) Patent No.: US 8,161,473 B2
(45) Date of Patent: Apr. 17, 2012

(54) DYNAMIC SOFTWARE FINGERPRINTING

(75) Inventor: Ross A. Norrie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1271 days.

(21) Appl. No.: 11/670,247

(22) Filed: Feb. 1, 2007

(65) Prior Publication Data

US 2008/0189326 A1    Aug. 7, 2008

(51) Int. Cl.
*G06F 9/44* (2006.01)
*G06F 17/00* (2006.01)

(52) U.S. Cl. ......... 717/174; 717/175; 717/177; 704/688

(58) Field of Classification Search ........................ None
See application file for complete search history.

(56) References Cited

U.S. PATENT DOCUMENTS

| | | | |
|---|---|---|---|
| 5,499,340 A * | 3/1996 | Barritz | 714/47 |
| 6,292,889 B1 | 9/2001 | Fitzgerald et al. | |
| 6,557,054 B2 | 4/2003 | Reisman | |
| 6,847,970 B2 * | 1/2005 | Keller et al. | 1/1 |
| 6,990,660 B2 | 1/2006 | Moshir et al. | |
| 7,069,541 B2 | 6/2006 | Dougherty et al. | |
| 7,089,306 B2 | 8/2006 | Thorpe et al. | |
| 7,089,552 B2 * | 8/2006 | Atallah | 717/175 |
| 7,243,306 B1 * | 7/2007 | Joshi et al. | 715/735 |
| 7,703,092 B1 * | 4/2010 | Glaser et al. | 717/177 |
| 2001/0007100 A1 * | 7/2001 | Revashetti et al. | 705/26 |
| 2001/0056386 A1 * | 12/2001 | O'Halloran et al. | 705/28 |
| 2002/0073106 A1 * | 6/2002 | Parker et al. | 707/200 |
| 2003/0008674 A1 * | 1/2003 | Cudak et al. | 455/466 |
| 2003/0051236 A1 * | 3/2003 | Pace et al. | 717/177 |
| 2003/0208593 A1 * | 11/2003 | Bharati et al. | 709/224 |
| 2004/0046785 A1 * | 3/2004 | Keller | 345/734 |
| 2004/0199621 A1 | 10/2004 | Lau | |
| 2005/0044057 A1 * | 2/2005 | Bluvshteyn et al. | 707/1 |
| 2005/0102383 A1 * | 5/2005 | Sutler | 709/223 |
| 2005/0108717 A1 * | 5/2005 | Hong et al. | 718/102 |
| 2005/0171961 A1 * | 8/2005 | Culbreth et al. | 707/100 |
| 2006/0004636 A1 | 1/2006 | Kester et al. | |
| 2006/0184932 A1 * | 8/2006 | Burnley et al. | 717/174 |
| 2008/0034363 A1 * | 2/2008 | Jones | 717/174 |

FOREIGN PATENT DOCUMENTS

WO    WO0153948 A2    7/2001

(Continued)

OTHER PUBLICATIONS

"Diffusion and Usage of Mobile Browsing in Finland 2005-2006", Antero Kivi, [Online], pp. 1-16, 2007, [Retrived on Nov. 14, 2011], [Retrived form Internet], <http://citeseerx.ist.psu.edu/viewdoc/download?doi=10.1.1.94.5895&rep=rep1&type=pdf>.*

(Continued)

*Primary Examiner* — Thuy Dao
*Assistant Examiner* — Ziaul A Chowdhury
(74) *Attorney, Agent, or Firm* — Lee & Hayes, PLLC

(57) ABSTRACT

Embodiments of dynamic software fingerprinting techniques are presented herein. In an implementation, an inventory of applications installed on a client is performed by examination of one or more inventory categories. Relationships are then created between the installed applications from the inventory and one or more supplemental categories. Based on the relationships created, a fingerprint inventory corresponding to the client is produced which describes: the relationships; the installed applications of the client; categories including the applications; and attributes corresponding to the applications.

18 Claims, 5 Drawing Sheets

FOREIGN PATENT DOCUMENTS

WO     WO2004111841 A2     12/2004

OTHER PUBLICATIONS

"A Framework for Dynamic Resource Management on the Grid", Jyotishman Pathak, [Online],pp. 1-11, 2005, [Retrieved on Nov. 14, 2011], [Retrieved from Internet], <http://citeseerx.ist.psu.edu/viewdoc/download?doi=10.1.1.95.2880&rep=rep1&type=pdf>.*

"External Monitoring of Endpoint Configuration Compliance", Darrell M Kienzle et al. [Online], pp. 1-11, 2009,[Retrieved on line document on Nov. 14, 2011],[Retrieved from Internet], <http://delivery.acm.org/10.1145/1560000/1558667/a52-kienzle-slides.pdf>.*

"Enumerating Installed Software", retrieved on Dec. 4, 2006 at <<http://www.microsoft.com/technet/scriptcenter/guide/sas_cpm_dgls.mspx?mfr=true>>, Microsoft Corporation, 2006, pp. 1-4.

"Everest-Network Audit & Management", retrieved at <<http://www.raxco.be/pages/info/Everest/everestpro.pdf>>, Raxco Software, 2004, pp. 2.

Seifried, "Software—RPM", retrieved on Dec. 4, 2006, at <<http://www.seifried.org/lasg/software/>>, Kurt Seifried, 2001, pp. 1-11.

\* cited by examiner

DYNAMIC SOFTWARE FINGERPRINTING

BACKGROUND

Software inventory applications may be provided for client devices and/or a network to enumerate software installations on the clients. Traditional software inventory applications techniques may derive software installations which provide as results merely a list of the software installations. In one technique, a software inventory application may drivescrape (e.g., examine the hardrive(s)) looking for executables (e.g. ".exe" files) that are present on the system. In another technique, a software inventory application may rely upon an installer list such as an Add/Remove Programs (ARP) list which may be provided with an operating system. However, these traditional techniques are limited to listing of installed applications such as by executable name, without correlating the applications to additional information which may be used to categorize and manage the applications, clients, and/or network. Thus, to correlate a list of installed applications provided via traditional software inventory techniques to additional information, users (for example, a system administrator) may be limited to collecting the additional data and producing the correlation manually and/or separately from the software inventory program itself, which may be time consuming and frustrating to the users.

SUMMARY

Dynamic software fingerprinting techniques are described in which relationships are created between derived software installations for a plurality of clients and a plurality of categories in which the installed applications may be included. In one or more embodiment, relationships are formed between applications discovered in inventory categories and supplemental categories. For instance, the installed applications on a plurality of clients may be enumerated and stored in a central data store. Then, for each client, the respective installed applications may be cross-referenced with supplemental categories and/or associated data to form relationships. These relationships form an improved "fingerprint" inventory which indicates, for each application of a client, the places (categories) where an application exists on the client; relationships of the application; how an enumerated application arrived at the client; what the application does; its reputation; attributes of the application; and so forth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Resources in an enterprise network may be licensed such that a customer purchases a license for each device or client accessing the resources. Thus, application inventories of clients may be performed by customers, administrators and/or providers for a variety of reasons such as to plan a network, determine license compliance, charge for services, and so forth. However, traditional techniques to inventory applications on a client may be limited to returning simple lists of installed executable or applications, which do not include information regarding the relationships of the applications such as the categories, versions, software packages, source of the install, and so forth. Thus, the traditional inventories may not provide enough information to accurately or efficiently determine license compliance.

Dynamic software fingerprinting techniques are described in which an inventory of applications on a client is related to with one or more supplemental inventory categories and/or associated data to form a variety of relationships corresponding to the applications. In this manner, a "fingerprint" inventory may be produced which not only indicates which applications are installed on a client, but may also incorporate relationships which indicate for each of the applications: the locations (categories) where the application may be found on the client; how the application arrived at the client (source of the install); what the application does; reputation data; various attributes of the application; and so forth.

In the following discussion, an exemplary environment is first described that is operable to employ the dynamic software fingerprinting techniques described, as well as other techniques. Exemplary procedures are then described which may be employed by the exemplary environment, as well as in other environments.

Exemplary Environment

Figure 1:
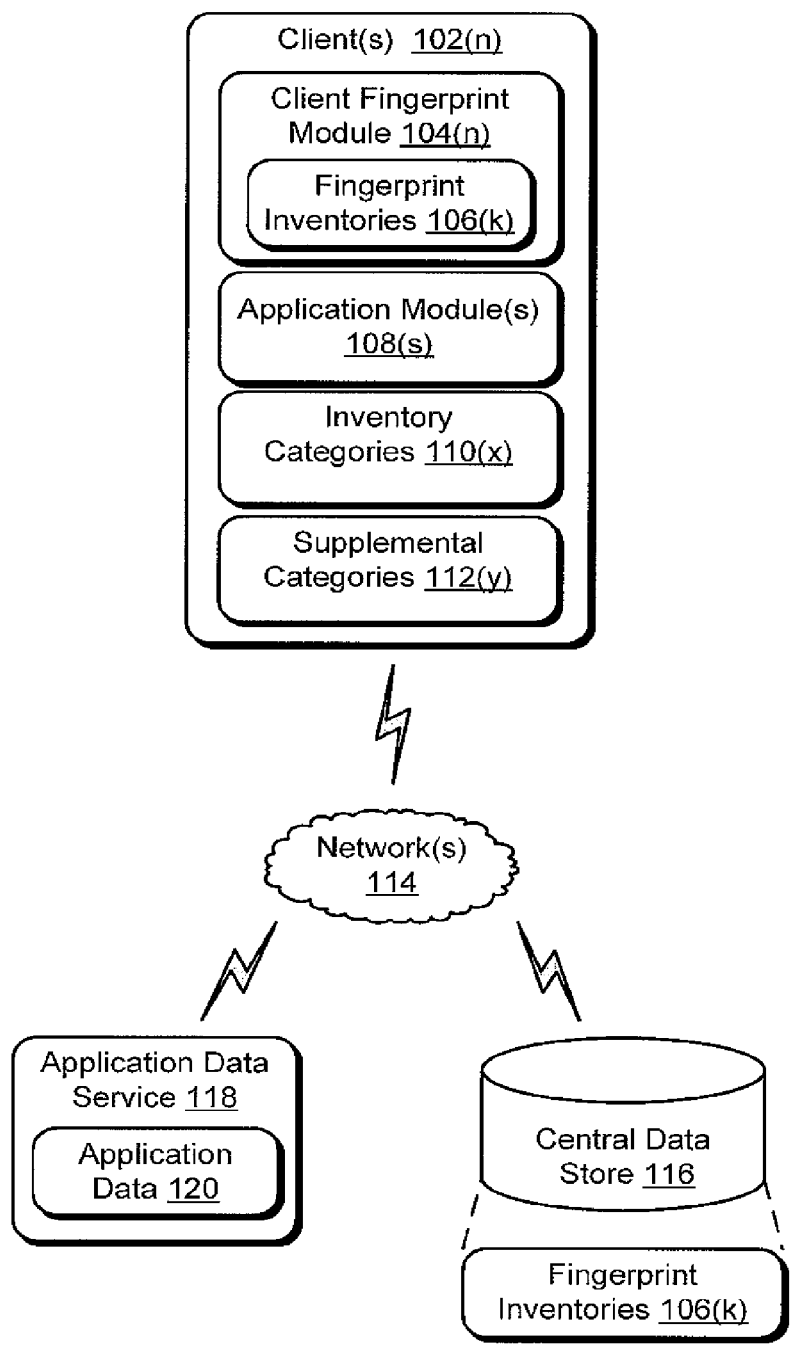
FIG. 1 is an illustration of an environment in an implementation that is operable to employ dynamic software fingerprinting techniques.

FIG. 1 is an illustration of an environment 100 in an exemplary implementation that is operable to employ dynamic software fingerprinting techniques. The environment 100 includes one or more clients 102(n) (where "n" may be any integer) each having a respective client fingerprint module 104(n). The client fingerprint modules 104(n) may represent a variety of functionality of the respective clients 102(n); including functionality to produce one or more fingerprint inventories 106(k) (where "k" may be any integer). Fingerprint inventories 106(k) may provide an enhanced inventory of applications 108(s) which may be found (e.g., installed) on the clients 102(n). The clients 102(n) may each include a variety of application modules 108(s) examples of which include, but are not limited to, applications configured to provide functionality for one or more of: client "front-end" database interactions with server based resources; email; instant messaging; web-browsing functionality to access web based services and content; home/office/business productivity functionality such as word processing, database, spreadsheet, and presentation functionality; operating system applications; client services; software development functionality such as development interfaces, tools, management, and compilation; and a wide variety of other computing functionality such as graphic design, and media management, editing, viewing, and/or playback.

Applications 108(s) may be discovered on a client 102 (e.g., identified as included/installed) upon examination of one or more inventory categories 110(x) to produce an inventory of applications installed on the client. The inventory of applications installed on the client may be an intermediate, building block, and/or starting point for producing the fingerprint inventories 106(k) described herein. A variety of techniques and inventory categories 110(x) are contemplated which may be used in producing the fingerprint inventories 106(k), further discussion of which may be found in relation to the following figures. The fingerprint inventories 106(k), in contrast to simple inventories produced via traditional techniques may combine an inventory produced via examination of one or more base inventory categories 110(x) with a variety of supplemental categories and/or data to "fingerprint" the application. The terms "fingerprint", "fingerprinting" and the like are used herein to refer to enumerating the relationships of applications 108(s) which are installed to a client 102, such that it is known not only which applications are installed (e.g., a listing), but also, based on the relationships, additional data such as how they arrived at the client, what they are doing on the client, where on the client the application may be found (e.g., start-up, metered applications), and so forth.

For instance, a variety of relationships may be formed between applications 108(s) enumerated in an inventory based on examination of the inventory categories 110(x) and a plurality of supplemental categories 112(y). Further, the client fingerprint modules 104(n), based on examination of the supplemental categories 112(y), may be configured to enumerate additional applications 108(s) which may not be discovered through examination of the inventory categories 110(x). Thus, a fingerprint inventory 106 may correspond to a plurality of applications 108(s) of a client 102 and for each application 108 may provide relationships to "fingerprint" the applications. The fingerprint inventory 106 may be formed through combinations of a variety of data which describe the relationships. This may provide an enhanced, richer inventory which may include various relationships to indicate how the applications 108(s) arrived at the client (e.g., installer, package, source data), what it is doing (attributes), where on the client the application may be found (e.g., in which inventory categories), and so on. The fingerprint inventories 106(k) may be utilized by a user (e.g., a system administrator) to manage security for a network, licensing for clients, and otherwise to manage a plurality of clients 102(n) in the network 114. Further discussion of fingerprint inventories 106(k), and inventory categories 100(x), 112(y) may be found in relation to in relation to the following figures.

In operation, the clients 102(n) via the client fingerprint module 104(n) may collect inventory data, categorize identified applications, gather supplemental application data, form relationships and/or application groupings, and so forth, to produce resultant fingerprint inventories 106(k). A client fingerprint module 104(n) may also be configured to communicate collected data and/or results (e.g., the produced fingerprint inventories 106(k)) via a network 114 to a centralized or global storage, such as central data store 116 depicted in FIG. 1. In an implementation, a central data store 116 is operable to maintain fingerprint inventories 106(k) for the plurality of clients 102(n) which are connected to the network 114. For instance, central store 116 may be implemented in a variety of ways such that the clients may interact with the central data store 116 via the network 114 to store and manipulate fingerprint inventories 106(k) as well as other data. While illustrated separately, the central data store 116 may also be provided via one or more of the clients 102(n) themselves. Additionally or alternatively, the clients 102(n) may each maintain respective inventory data and fingerprint inventories 106(k) in local storage. Further discussion of data storage suitable for maintaining fingerprint inventories 106(k), as well as other data, may be found in relation to the following figures.

The plurality of clients 102(n) may be configured in a variety of ways for accessing the network 114. For example, one or more of the clients 102(n) may be configured as a computing device, such as a desktop computer, a mobile station, an entertainment appliance, a set-top box communicatively coupled to a display device, a wireless phone, a game console, and so forth. Thus, the clients 102(n) may range from full resource devices with substantial memory and processor resources (e.g., personal computers, game consoles) to low-resource devices with limited memory, processing and/or display resources (e.g., traditional set-top boxes, hand-held game consoles, wireless phones). In other words, one or more of the clients 102(n) may describe logical clients that include software and/or devices. Further, the network 114 may assume a wide variety of configurations. For example, the network 114 may include a wide area network (WAN), a local area network (LAN), a wireless network, a public telephone network, an intranet, and so on. Further, although a single network 114 is shown, the network 114 may be configured to include multiple networks.

FIG. 1 also depicts an application data service 118 which represents functionality to collect, maintain, and provide a variety of application data 120 corresponding to one or more of the plurality of application modules 108(s). A variety of application data 120 associated with the applications 108(s) may be maintained by the data service 118 and accessed via the network 114 by the clients 102(n). For instance, the fingerprint modules 104(n) may access the application data service 118 to obtain application data 120 corresponding to applications 108(s) identified as installed on the clients 102(n). The application data 120 may be included in the respective fingerprint inventories 106(k). Additionally or alternatively, the application data 120 may be accessed via the network 114 to supplement the data in the fingerprint inventories 106(k), such as through a reporting application configured to provide interactions with the central data store 116 and associated fingerprint inventories 106. For example, a fingerprint inventory 106 corresponding to a client 102 may list a plurality of applications 108(s) installed on the client 106, which may include an application "txteditor.exe". The application data service 118 may maintain a variety of data regarding "txteditor.exe" examples of which include but are not limited to reputation data, version info, installed package information, and so forth. Thus, the application data 120 may be cross-referenced or combined with a fingerprint inventory 106 to provide even more information about applications 108(n) listed in the fingerprint inventory 106. A variety of other examples are also contemplated.

Figure 2:
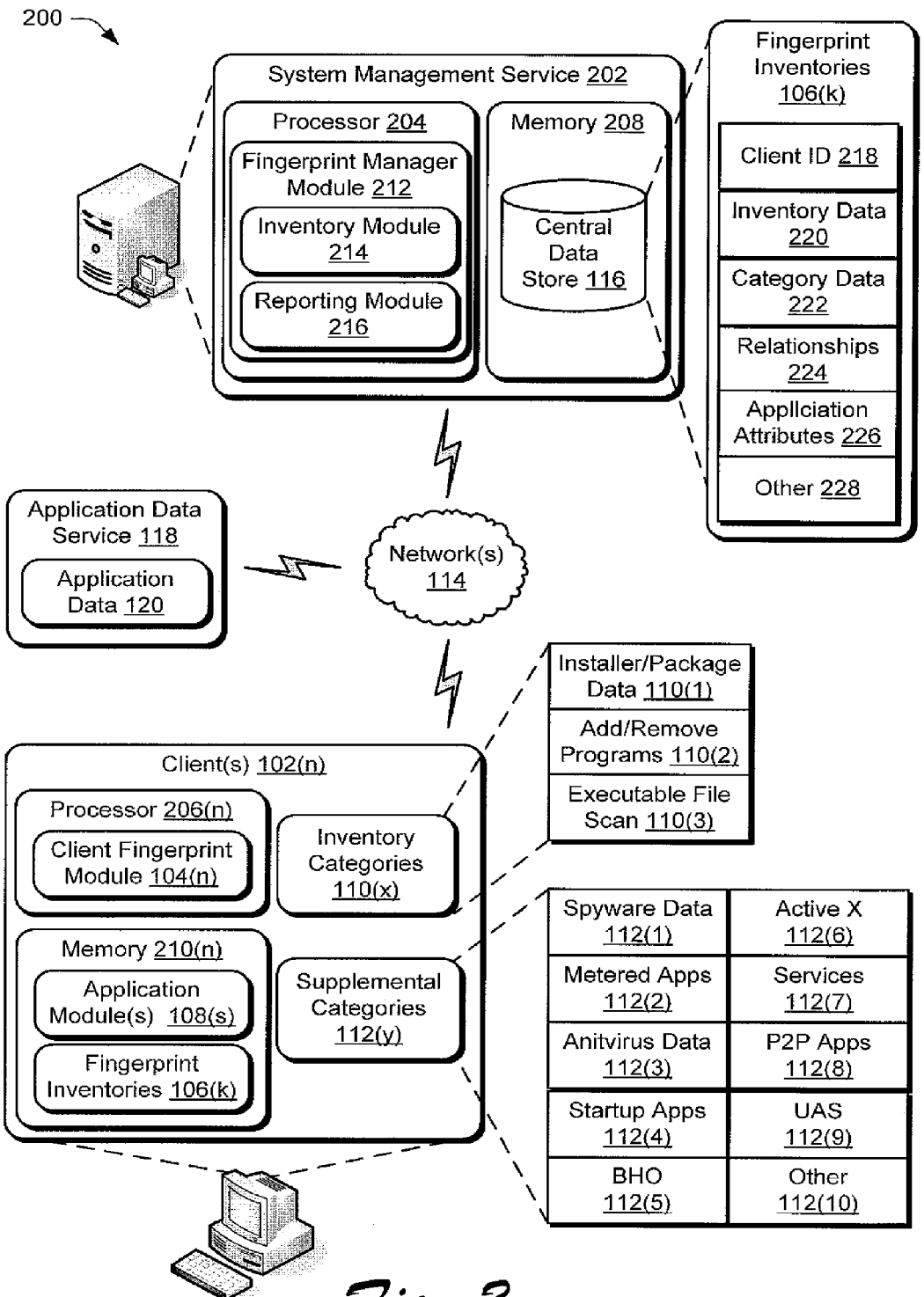
FIG. 2 is an illustration of a system in an exemplary implementation showing devices to employ dynamic software fingerprinting techniques.

FIG. 2 is an illustration of a system 200 in an exemplary implementation showing clients 102(n) of FIG. 1 in greater detail FIG. 2 further depicts a system management service 202 which is representative of a variety of functionality to manage the clients 102(n), the network 114, and so forth. System management service 202 may be implemented by one or more servers to provide centralized management of a plurality of clients 102(n) and associated resources. For example, in one embodiment, the environment 200 of FIG. 2 may represent a managed network or a portion thereof such as an enterprise network in which the clients 102(n) are situated. A managed or enterprise network typically includes a variety of clients 102(n) which may access resources from the network (e.g., network 114), such as a variety of databases (e.g., production, orders, customers, quality, human resources, and so forth) from resource servers (not shown). Access to some resources may be according to a licensing scheme, for instance, using licenses to permit access to server query language (SQL) databases or other databases, network applications, and/or other types of server-based resources. The access by clients 102(n) to such "enterprise" resources may be through direct interactions with the resource servers and/or via one or more intermediate application servers (not shown) which may be implemented to provide server based "front-end" applications suitable for accessing of the "back-end" resources by the clients 102(n). Accordingly, system management service 202 may represent functionality which is operable to perform management operations in the enterprise system, such as: managing the clients 102(n), licensing for the clients, client resources, servers; asset tracking; client software inventories; software updates; and so forth. The described fingerprint inventories 106(k), in addition to other uses, may be employed to assess and/or track license compliance in an enterprise system.

The system management service 202 and clients are depicted in FIG. 2 as each having respective processors 204, 206(n) and memories 208, 210(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. While in places herein a single processor may be depicted or described, multiple processor arrangements are contemplated such as a processor core which includes a variety of processing devices. Likewise, while a single memory may be shown or described for a device or component, a wide variety of types and combinations of memory may be employed, such as random access memory (RAM), hard disk memory, removable medium memory, and other computer-readable media.

The system management service 202 is further depicted as including a fingerprint manager module 212 which is executable via the processor 204 and is also storable in the memory 208. The system management service 202 is also depicted as having the central data store 116 in the memory 208 to maintain fingerprint inventories 106(k) corresponding to a plurality of clients 102. The central data store 116 may be configured in a variety of was such as a relational database, object oriented database, or other suitable storage.

Fingerprint module 212 is representative of a variety of functionality including, but not limited to, functionality to manage the central data store 116; collect and/or produce fingerprint inventories 106(k) corresponding to the plurality of clients 102(n); provide access to the data store for data manipulation, queries and reporting; interact with the application data service 118; and so forth. In an implementation, the fingerprint manager module 212 may include a variety of sub-modules to provide associated functionality including an inventory module 214 and reporting module 216. For instance, the inventory module 214 may be executed to interact with the client 102(n) and in particular to interact with the client fingerprint modules 104(n) of a plurality of clients 102(n). Inventory module 214 may represent functionality of the system management service 202 to interrogate the clients 102(n) via the network; to create an inventory enumerating installed applications; to cause the performance of inventories by the clients 102(n); to collect data or fingerprint inventories 106(k); to produce fingerprint inventories 106(k) of the clients 102(n) via the network 114; and so forth. The reporting module 216 may be executed via the processor 204 to provide a variety of reporting functionality for interactions with the fingerprint inventories 106(k) and/or central data store 116. Reporting module 216 may be configured to provide a variety of database analysis, query, and reporting techniques, and/or other data access techniques to manipulate, summarize, and otherwise interact with the central data store 116. Reporting module 216 is representative of a variety of functionality to produce a variety of outputs including reports, graphs, alerts, and so forth which may organize and present the fingerprint inventories 106(k) in many different formats. Such outputs may be printed, displayed on a display device, electronically communicated such as via email, instant messaging, or mobile alerts, automatically generated or on demand, pre-configured or ad-hoc, and so forth.

The clients 102(n) are depicted as executing respective fingerprint modules 104(n) on processors 206(n) which are also storable in memories 210(n). Memories 210(n) are further illustrated as storing applications 108(s), which may be executed via the processors 206(n), as well as storing fingerprint inventories 106(k). Fingerprint inventories 106(k) stored at the clients 102(n) may be produced at the clients 102(n) via execution of the client fingerprint modules 104(n) and/or via the fingerprint manager module 212 operating to interrogate the clients 102(n) over the network 114 and/or to cause execution of the client fingerprint modules 104(n) to form the inventories.

As previously described, an inventory to enumerate installed applications 108(s) on a client 102 may reference one or more different inventory categories 110(x). Examples of inventory categories 110(x) as illustrated in FIG. 2 may include, but are not limited to, data obtained from an installer/package store 110(1), an add/remove programs 110(2) listing or other installed software list, an executable file scan 110(3) of the clients 102(n), and so forth. Various combinations of different inventory categories 110(x) may be employed to produce a base or initial inventory enumerating installed applications 108(s) on the client. A variety of associated data may also be collected and related to the applications 108(s) which are discovered by the inventory. Data which may be collected in this enumeration for each discovered application 108 includes, but is not limited to, client identifiers 218, inventory data 220 which may indicate which applications 108(s) are installed on a client 102, application attributes 226 such as manufacturer, name and/or other identifiers of the application (e.g., product IDs, hash, signature, binary) contact data, version data, estimated size of the install, install date, help links associated with the application, install location, install source, uniform resource locator (URL), and so forth. Generally, but not necessarily, the data collected in the inventory to enumerate installed applications 108(s) is data which is available from the installed applications 108(s) themselves.

In addition, the applications 108(s) may be correlated via name, id, application signatures, hash, and the like to additional application data 120 to provide even more information. In an implementation the application data 120 is accessible from an application data service 118 via the network 114. Naturally, application data 120 may alternatively be available via a local data storage of the clients 102(n) (memories 210(n)), via the system management service 202, or via other suitable local or network accessible storage location. The application data 120 is representative of a variety of additional data which may be included in the fingerprint inventories 106(k) such as application attributes 226 which are related to applications 108(s). Examples of such data include, but are not limited to, product suite data; company name; file version; internal name; language; product name; product id; description; version; trustworthiness ratings; community based reputations; license data to relate applications to licenses and/or agreements; and a variety of other data which may be related to the discovered applications. Thus, an inventory which forms a building block for a "fingerprint" inventory may be formed which identifies applications, matches the applications to installed suites, places applications in groups/categories, and which may incorporate a variety of additional application data 120 from a variety of sources.

Once an inventory enumerating installed applications 108(s) on the client is arrived at, the inventory may be supplemented to relate the enumerated applications to one or more supplemental categories 112(y) as well as to identify applications in the supplemental categories 112(y) which were not enumerated in the inventory. In other words, a fingerprint inventory 106 corresponding to a client 102 is produced through examination of one or more supplemental categories 112(x) and the formation of relationships between the inventories, applications, clients and the categories. Supplemental categories 112(y) are representative of distinct lists, groupings and categories in which applications installed on a client may have a presence. Examples of supplemental categories 112(y) as illustrated in FIG. 2 may include, but are not limited to, spyware data 112(1), metered applications 112(2), antivirus data 112(3), startup applications 112(4), browser helper objects 112(5), active x controls 112(6), services 112(7) of the client, peer-to-peer (P2P) applications 112(8); and user accessible software (UAS) 112(9) from an operating system interface (e.g., links or shortcuts on a menu, desktop, toolbar, and so on). For instance, an executable "music.exe" discovered in an executable scan may be found or placed in the peer-to-peer (P2P) applications 112(8). A variety of other 112(10) categories of applications 108(s) and examples are also contemplated.

As noted, the central data store 116 may represent functionality to maintain and provide access to fingerprint inventories 106(k) corresponding to a plurality of clients 102(n). Each fingerprint inventory 106 may describe a plurality of applications 108(s) which are installed on a corresponding client 102 and correlate each of those applications 108(s) to various categories 110(x), 112(y) and associated data as previously described. For instance, the fingerprints inventories 106(k) may include, but are not limited to: client identifiers 218 and/or other referencing data or indices which may be used to associate corresponding clients 102(n); inventory data 220 which describes or list installed applications 108(s), category data 222 which may describe categories in which applications 108(s) exist on a client 102, relationships 224 which relate the clients 102(n) and/or applications 108(s) to other clients, categories, applications, groups of clients, attributes, software packages or suites, and; application attributes 226 which may describe for corresponding applications reputation data, trustworthiness rating; purposes for the applications, types, versioning information; and a variety of other 228 data which may enhance a simple list of installed applications one example of which is application data 120 from a application data service 118 or other suitable storage.

The fingerprint inventories 106(k) which are produced may then be used to examine the relationships of applications 108(s) on a client 102. For instance, a discovered executable "txt.exe" may be traced back to a group or suite of applications with which it was installed, such as a productivity suite, and to associated application data 120 for a service 118, application attributes 226, category data 222, and so forth. The fingerprint inventories 106(k) may further include version information, usage data (e.g., metering), reputations, license information, and so forth which may be used to determine if the application is safe or unsafe, in compliance with licenses, and so on. In another example, an installed suite may be the starting point to trace/track all of the executables from the suite installed on the client 102. Thus, fingerprint inventories 106(k) may form a traceable tree of relationships for applications 108(s) which are discovered on the clients 102(n).

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of dynamic software fingerprinting techniques described below are platform-independent, meaning that the techniques may be implemented on a variety of commercial computing platforms having a variety of processors. Further discussion of dynamic software fingerprinting techniques may be found in reference to the following procedures.

Exemplary Procedures

The following discussion describes techniques for dynamic software fingerprinting that may be implemented utilizing the previously described systems, interfaces, and devices. Reference will be made in the course of the discussion of the following procedures to the environment depicted in FIG. 1 and the system depicted in FIG. 2. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 3:
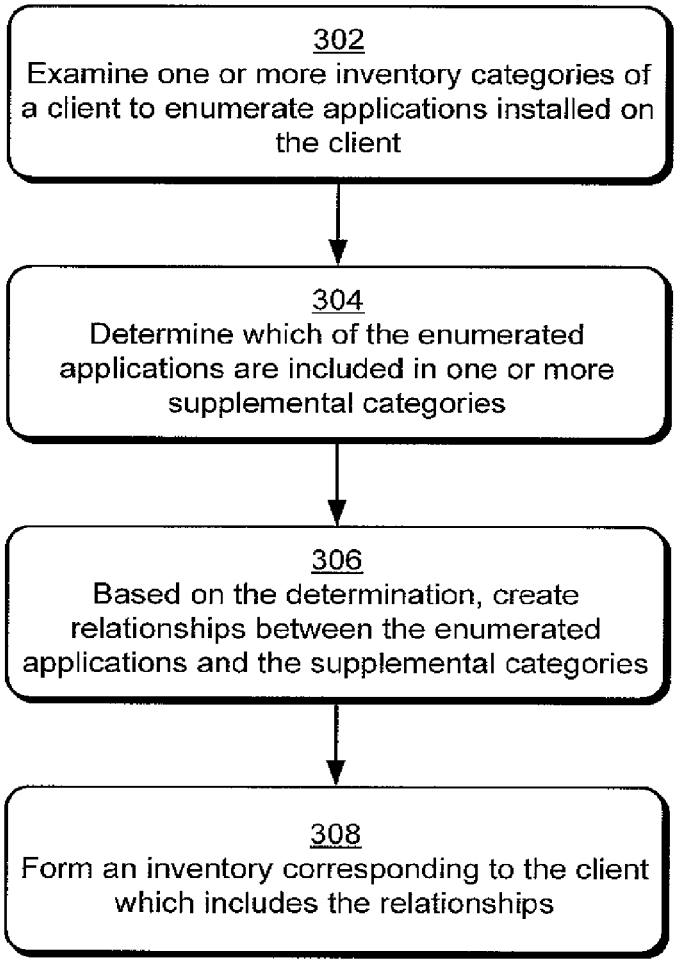
FIG. 3 depicts a procedure in an exemplary implementation in which relationships are formed between enumerated applications and supplemental categories.

FIG. 3 depicts a procedure 300 in an exemplary implementation in which a fingerprint inventory is produced. In block 302, one or more inventory categories of a client are examined to enumerate applications installed on the client. For instance, the inventory module 214 may be executed to perform inventories of applications installed on one or more of the clients 102(n). The inventory module 214 may operate to interrogate the clients 102(n) and examine one or more inventory categories 110(x) to discover installed applications 108(s). Alternatively, the inventory module 214 may cause execution of a client fingerprint module 104 to perform the inventory, such as via commands and/or messages communicated between the client 102 and system management service 202. The inventory may identify a plurality of applications 108(s) installed on a client. Further, the inventory may be formed to include a variety of additional data about each of the applications 108(n) examples of which include associations with installed software suites, category data 224, version information and application data 120 as previously described. For the purposes of example, assume that an inventory is generated which identifies various applications 108(s) including exemplary applications "foo.exe" and "wordprocess.exe". "Foo.exe" in this example may have been identified through an executable scan 110(3) of a client 102. "Wordprocess.exe"

may have been identified through examination of an installer/package store 110(3) and associated data. A variety of other examples are contemplated.

In block 304, enumerated applications which are included in one or more supplemental categories are determined. For example, the inventory module 214, alone or in conjunction with a client fingerprint module 104, may examine one or more supplemental categories 112(y) for a corresponding client 102 to determine which of the applications 108(s) are included in each of the categories. Continuing the preceding example, examination of startup applications 112(4) category may discover that "foo.exe" is included. Further, examination of antivirus data 112(3) may identify that "foo.exe" is listed as malicious software. The application "wordprocess.exe" may be identified as included in metered applications 112(2) at the time of the inventory. A variety of other examples are contemplated. In addition to determining the enumerated applications, examination of supplemental categories 112(y) may discover applications which we not detected through examination of the inventory categories 110(x), further discussion of which may be found in reference to FIG. 4.

In block 306, relationships are created between the enumerated applications and the supplemental categories based on the determination. For instance, the inventory module 214 may be operable to store data which describes various relationships based on the examination of supplemental categories 112(y). In an implementation, the initial inventory of applications 108(s) by the inventory module 214 and/or client fingerprint module 104 may be stored in central data store 116. In one embodiment, the results of the inventory are maintained as data records corresponding to each of the enumerated applications 108(s). These data records may be modified to include the relationships, such as including category identifiers, cross-referencing data, data fields, or other suitable techniques to describe the relationships. Thus, in the preceding example, "foo.exe" is related to the categories startup applications 112(4) and antivirus data 112(3) and "wordprocess.exe" is related to the category metered applications 112(2).

In block 308, an inventory corresponding to the client is formed which includes the relationships. For example, as depicted in FIG. 2 various relationships 224 may be included in a fingerprint inventory 106 for a client 102. The client fingerprint module 104 of a client 102 may combine an inventory of applications formed via examination of categories 110(x) with relationships 224 formed via examination of supplemental categories 112(y). A variety of fingerprint inventories 106(k) corresponding to a plurality of clients 102 (n) may be formed and stored in the central data store 116. Client IDs 218 and/or other indices may be included to reference fingerprint inventories 106(k) corresponding to a particular client 102 or group of clients 102(n). As noted fingerprint inventories 106(k) may further include additional data including inventory data 220, category data 222, application attributes 226 and other 228 associated data. The fingerprint inventories 106(k) may then be referenced via the central data store 116 to perform various management functions for the clients 102(n), to generate reports via a reporting module 216, and so forth.

As a further example, consider the exemplary word processor "wordprocess.exe" which is discovered upon an inventory of the client 102. The executable may have arrived at a client 102 in a variety of manners, such as being a stand alone application or along with various software packages or suites and might represent a number of different versions of the application (e.g., same executable name). Thus, an inventory which identifies simply that "wordprocess.exe" is running on a system will not provide information sufficient to relate the application to specific products, attributes, categories and so forth. Thus, for instance, determining license compliance may be difficult. However, using the dynamic fingerprinting techniques described herein a variety of relationships and additional data are associated with the inventory to form a "fingerprint". Thus, using the dynamic fingerprinting techniques it may be possible to determine that the version of "wordprocess.exe" originated from an installed professional productivity suite; a product identifier of the executable, which by way of example may be in the form of xxxxx-xxx-xxxxx-xxxxx; the application appears in a list of start-up applications; it was metered at the time of the inventory; it had been used for four hours; and a variety of other relationships and associated data. The inventory may further include or may be utilized to match an application 108 with corresponding application data 120 available from a application data service 118 or other network source to determine the source of the application, such as purchased retail or online, from an original equipment manufacture (OEM) install, and so forth. A variety of other examples are contemplated.

Figure 4:
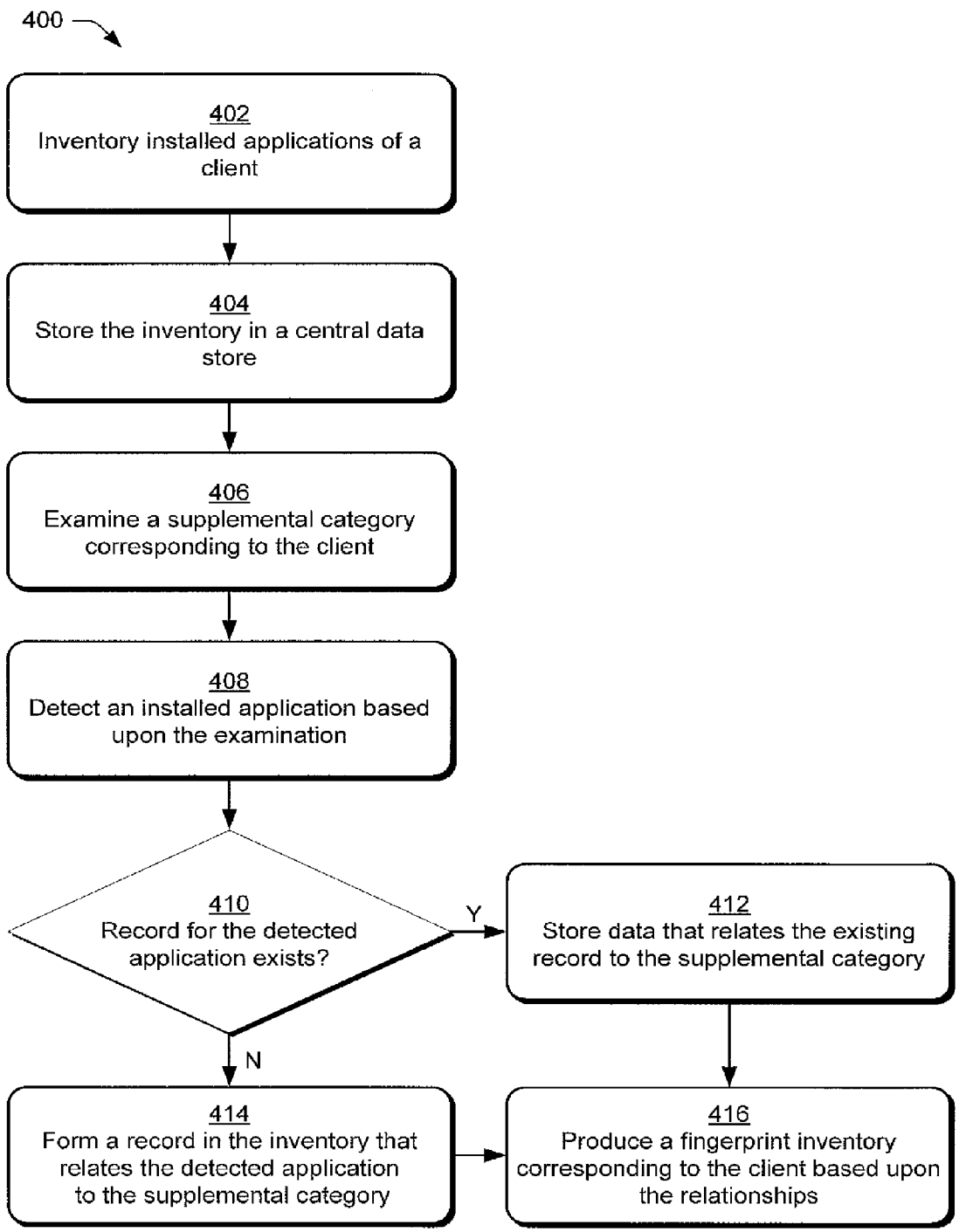
FIG. 4 depicts a procedure in an exemplary implementation in which relationships corresponding to an application detected in a supplemental category are formed.

FIG. 4 depicts a procedure 400 in an exemplary implementation in which a supplemental category is examined and related to applications of a client. In block 402, an inventory of installed applications on a client is performed. For example, one or more of the clients 102(n) in FIG. 1 may execute a respective client fingerprint module 104(n) to examine associated inventory categories 110(x). Applications 108(s) which are installed on the client 102 may be discovered through examination of the categories 110(x). In addition to identifying the installed applications 108(s), data collected for each of the applications 108(s) may include various additional data available directly from the applications or from an application data service 118. The data collected in this operation may represent a building block or intermediate for generating a fingerprint inventory 106. The inventory and associated data may identify installed applications; group applications by type, suite, package and so forth; describe install details such as install data, versions; size; identify application sources such as manufacturer, product type, install type; and so forth.

In block 404, the inventory is stored in a central data store. For instance, the client fingerprint modules 104(n) may operate to communicate the inventory data produced by examination inventory categories 110(x) via network 114 to a central storage database. Alternatively, the inventory module 214 deployed to a system management service 202 as in FIG. 2 may operate to interrogate each of clients 102(n) over the network 114 to collect the inventory data for each client 102. A record may be created for each application 108(s) which is discovered. In an embodiment, the results of an inventory are stored as data records in the central data store 116 as in FIG. 1. Additionally or alternatively, data gathered in the inventory of categories 110(x) may be stored locally such as in random access memory (RAM). Then, the locally stored inventory data may be further processed to form fingerprint inventories 106(k), which may then be communicated to the central data store 112.

In block 406, a supplemental category corresponding to the client is examined. In block 408, an installed application is detected based upon the examination. In block 410, a determination is made whether a record for the detected application exists. For example, once an inventory has been arrived at by the examination of inventory categories 110(x) as described above, a variety of supplemental categories 112(y) may be examined to create relationships between discovered applications and the categories; and to discover additional applications which may not have shown up through examination of inventory categories 110(x). For example, an application "toolbar.exe" which is a browser toolbar may be discovered by examination of a browser helper object 112(5) category and an application "pdamanage.exe" to manage a personal digital assistant may be detected by examining user accessible software (UAS) 112(9) category, such as included in application icons on the client 102 desktop. The detected applications "toolbar.exe", "pdamanage.exe" may each be cross-referenced with the inventory previously produced to determine if they have already been accounted for in the inventory. Naturally, this may be repeated for numerous supplemental categories 112(y) and detected applications 108(s).

In block 412, when a record exists, data is stored that relates the existing record to the supplemental category. For example, "pdamanage.exe" in the previous example may have been installed by the installer for a client such as from computer readable media. Thus, enumeration of applications 108(s) for a client 102 via the inventory categories 110(x) will include "pdamanage.exe" and/or associated data. To account for the discovery of "pdamanage.exe" in one or more supplemental categories 112(y) which are examined, the existing data record corresponding to "pdamanage.exe" may be modified, updated, or combined with data that relates "pdamanage.exe" to one or more supplemental categories 112(y). For instance, a data record corresponding to "pdamanage.exe" may be updated to include data relating "pdamanage.exe" to user accessible software (UAS) 112(9) category may be added.

In block 414, when a record does not exist, a record is formed in the central data store that relates the detected application to the supplemental category. For example, "toolbar.exe" may not have been identified in the previously produced inventory based on the inventory categories 110(x). In this case, a new record or other suitable data is formed that relates a discovered application to an examined supplemental category 112(y). For instance, a new record or data may be added to the previously produced inventory which accounts for the discovery of "toolbar.exe" on an associated client 102. Additionally, data is included that relates "toolbar.exe" to the browser helper object 112(5) category in which it was discovered. As with applications discovered through the inventory categories 110(x), a variety of data available from the applications itself or from an application data service 118 may also be included in records which are created based on examination of the supplemental categories 112(y).

In block 416, a fingerprint inventory corresponding to the client is produced based upon the relationships. For example, through the inventory of applications 108(s) and examination of supplemental categories 112(y), a client fingerprint module 104 and/or inventory module 212 may collect and/or produce a variety of data which describes applications, attributes of the applications, relationships of the applications and so forth. A client fingerprint module 104 and/or inventory module 212 may perform acts separately or in combination to form fingerprint inventories 106(k) based upon such data from one or more clients 102(n). Fingerprint inventories 106(k) indicate not only which applications are installed (e.g., a listing), but also, based on the relationships, additional data such as how they arrived at the client, what they are doing on the client, where on the client the application may be found, and so forth. Fingerprint inventories 106(k) may be formed which include relationships 224 as well as inventory data 220, category data 222, application attributes 226, and various other 228 data associated with applications 108(s) and/or clients 102(n).

Figure 5:
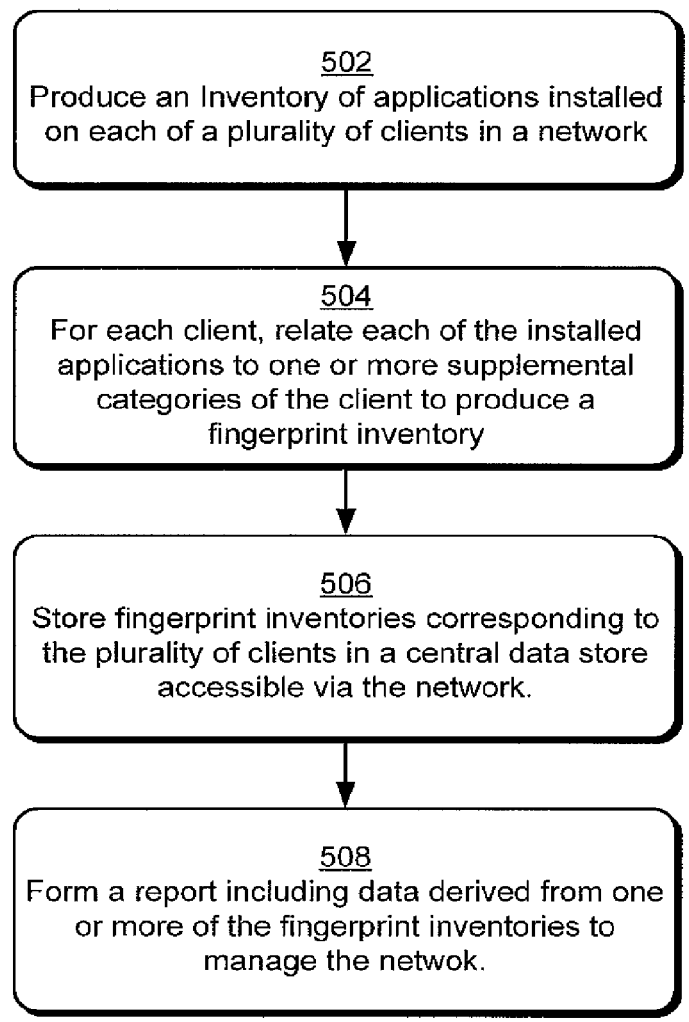
FIG. 5 depicts a procedure in an exemplary implementation in which dynamic software fingerprinting techniques are employed to produce fingerprint inventory for a plurality of networked clients.

FIG. 5 depicts a procedure 500 in an exemplary implementation in which fingerprint inventories are formed for a plurality of clients in a network. In block 502, an inventory of installed applications on a client is produced for each of a plurality of clients in a network. For example, a system management service 202 as in FIG. 2 may be operable to cause an inventory of applications 108(s) for each of a plurality of clients 102(n) in a network 114. In an implementation, the network 114 may represent an enterprise or other managed network. Thus, the system management service 202 may provide management features to manage the associated clients 102(n) in the network 114. The management of the network 114 by the system management service 202 may include functionality to determine which applications 108(s) are installed on each of the clients 102(n), e.g. to inventory the applications 108(s). For instance, and inventory module 214 may be executed to perform or cause an inventory via examination of one or more inventory categories 110(x) corresponding to the clients 102(n). In an embodiment, the inventory module 214 operates in conjunction with client fingerprint modules 104(n) deployed to the clients 102(n) to perform the inventory, as well as to perform other acts.

In block 504, for each client, the installed applications are related to one or more supplemental categories of the client to produce a fingerprint inventory. For instance, inventory module 214 may be executed to perform or cause examination of one or more supplemental categories 112(y) corresponding to the clients 102(n) to determine which applications 108(s) are included in the respective categories. Then, based on the examination, relationships 224 may be formed between the applications 108(s) discovered on a client 102 and the supplemental categories 112(y). The relationships 224 are used to produce a fingerprint inventory 106. Fingerprint inventories 106(k) corresponding to clients 102(n) are illustrated in FIG. 2 as including relationships 224 as well as a variety of other data. For example, in a fingerprint inventory 106 may be associated with a client 102 via a client ID 218. The fingerprint inventory 106 may also be associated with inventory data 220 and category data 222. Relationships 224 are also included which may relate applications 108(s) from the inventory data 220 to the category data 222. Additional data such as application attributes 226 and other data 228 may also be included in the fingerprint inventories 106(k) produced.

In block 506, fingerprint inventories corresponding to the plurality of clients are stored in a central data store accessible via the network. For example, central data store 116 as in FIG. 2 may be provided by the system management service 202 to store a plurality of fingerprint inventories 106(k). Each of the fingerprint inventories 106(k) may correspond to one or more of the clients 102(n), such as through various included client identifiers 218.

In block 508, a report including data derived from one or more of the fingerprint inventories is formed to manage the network. For instance, clients 102(n) and users of the clients (for example, a system administrator) may be provided access to the central data store 116 to perform data manipulation, analysis, reporting, and so forth. Reporting module 216 of FIG. 2 may be executed to perform various management functions for the network 114 and/or clients 102(n) including producing of reports based upon the stored fingerprint inventories 106(k). A variety of reports based upon the stored fingerprint inventories 106(k) are contemplated which present the fingerprint inventories 106(k) in various formats. A variety of database query, reporting, analysis, and techniques may be employed to utilize the stored fingerprint inventories 106(k) to output reports. For example, a licensing report may indicate all the licensed applications, indicate which are metered at the time of the inventory, track how long they have been during a tracking period, relate applications to software packages or suites in which they belong, provide version data, and so forth. Another report or portion of the same report may list all unauthorized or unknown applications, e.g. those which have been installed without permission of the system administrator. The list of unauthorized applications may be supplemented with application data 120 indicating the trustworthiness or reputation of the application. Thus, the report may be used such as by a system administrator or other user to determine whether applications are harmful or benign, which are ok to be installed at the clients 102(n) or should be removed, and so forth. The central data store 116 permits reports to be produced which correspond to a single client 102, a group of clients 102(n), and/or the entire network 114.

CONCLUSION

Although embodiments of dynamic software fingerprinting techniques have been described in language specific to features and/or methods, it is to be understood that the subject matter of the appended claims is not necessarily limited to the specific features or methods described. Rather, the specific features and methods are disclosed as example implementations of dynamic software fingerprinting techniques.

What is claimed is:

1. A method, executed by a processor, comprising:
producing an inventory of applications for each of a plurality of clients in a network, the producing including:
  for each client, examining one or more inventory categories to identify applications installed on the client;
  enumerating the applications installed in the client;
  examining a plurality of supplemental categories of the client, each of the plurality of supplement categories being respective of a distinct grouping in which one or more of the enumerated applications that are installed on the client have presence;
  based on the examination of the plurality of supplemental categories for the client, creating relationships between each of the enumerated applications and respective supplemental categories;
  based on the examination of the plurality of supplemental categories for the client, discovering one or more additional applications on the client not identified via the examination of the one or more inventory categories and creating records for each of the one or more additional applications that relate each of the one or more inventory categories; and
  forming an inventory for the client in a central data store accessible via the network.

2. A method as recited in claim 1, further comprising forming a report derived from one or more of the inventories to manage the network.

3. A method as recited in claim 1, wherein the inventory corresponding to each client includes:
  inventory data enumerating the installed applications of the client;
  relationships corresponding to related applications that are installed on the client; and
  application attributes corresponding to the applications.

4. A method as recited in claim 1, wherein the inventory corresponding to at least one client includes data to describe a source of one or more of the installed applications.

5. A method as recited in claim 1, wherein the inventory corresponding to at least one client includes data obtained from an application data service to describe a trustworthiness of one or more of the installed applications.

6. A method as recited in claim 1, wherein the inventory corresponding to at least one client includes data to describe a reputation of one or more of the installed applications.

7. A system for producing an inventory of applications for each of a plurality of clients in a network, comprising:
  a processor; and
  a memory coupled to the processor storing:
    an inventory module, 0p6iable by the processor, that for each client:
      examines one or more inventory categories of the client to identify applications installed on the client;
      enumerates the applications installed on the client;
      examines a plurality of supplemental categories of the client, each of the supplemental categories being representative of a distinct grouping in which one or more of the enumerated applications that are installed on the client have a presence;
      determines which of the enumerated applications installed on the client are included in each of the plurality of supplemental categories;
      creates relationships between each of the enumerated applications and respective supplemental categories;
      discovers one or more additional applications on the client not identified via the examination of the one or more inventory categories;
      creates records for each of the one or more additional applications that relate each of the one or more additional applications to at least one of the one or more inventory categories; and
      generates an inventory corresponding to the client based at least in part on the relationships and the records; and
    a reporting module, operable by the processor, that forms a report including the respective inventories corresponding to the plurality of clients.

8. The system as recited in claim 7, wherein the inventory categories are selected from a group comprising:
  installer data;
  package data;
  add remove programs data; and
  an executable scan.

9. The system as recited in claim 7, wherein the report is communicated to and maintained in a central data store accessible via the network.

10. One or more computer readable memory comprising computer executable instructions which, when executed, direct a computer to:
  examine one or more inventory categories of a client to identify applications installed on the client;
  enumerate the applications installed on the client;
  examine a plurality of supplemental categories of the client, each of the supplemental categories being representative of a distinct grouping in which one or more of the enumerated applications that are installed on the client have a presence;
  determine which of the enumerated applications installed on the client are included in each of the plurality of supplemental categories;
  based on the determination, create relationships between each of the enumerated applications and respective supplemental categories;
  based on the examination of the plurality of supplemental categories, discover one or more additional applications on the client not identified via the examination of the one or more inventory categories;

create records for each of the one or more additional applications that relate each of the one or more additional applications to at least one of the one or more inventory categories; and form an inventory corresponding to the client based at least in part on the relationships and the records.

11. One or more computer readable memory as recited in claim 10, wherein the plurality of supplemental categories are selected from a group comprising spyware, startup applications, metered application, services of the client, browser helper objects, virus data, peer-to-peer applications, and user accessible software.

12. One or more computer readable memory as recited in claim 10, wherein the one or more inventory categories of the client are selected from a group comprising:
- installer store data;
- package store data;
- add remove programs data; and
- an executable file scan.

13. One or more computer readable memory as recited in claim 10, wherein the inventory identifies the applications installed on the client and for each application indicates identified relationships to other applications that are installed on the client.

14. One or more computer readable memory as recited in claim 10, wherein the relationships and the records form a fingerprint inventory.

15. One or more computer readable memory as recited in claim 10, wherein the relationships and the records indicate how each application: arrived at the client; what the application does; and the inventory categories in which the application may be found.

16. One or more computer readable memory as recited in claim 10, further comprising instructions to store the inventory in a data store maintained locally at the client.

17. One or more computer readable memory as recited in claim 10, further comprising instructions to communicate the inventory to a central data store which maintains inventories corresponding to a plurality of clients in a network.

18. One or more computer readable memory as recited in claim 17, wherein the network is an enterprise network.

* * * * *

UNITED STATES PATENT AND TRADEMARK OFFICE
CERTIFICATE OF CORRECTION

| | | |
|---|---|---|
| PATENT NO. | : 8,161,473 B2 | Page 1 of 1 |
| APPLICATION NO. | : 11/670247 | |
| DATED | : April 17, 2012 | |
| INVENTOR(S) | : Ross A. Norrie et al. | |

It is certified that error appears in the above-identified patent and that said Letters Patent is hereby corrected as shown below:

Column 13, line 34, change "enumerating the applications installed in the client" to -- enumerating the applications installed on the client --.

Column 13, line 37, change "being respective of a distinct grouping in which one or" to -- being representative of a distinct grouping in which one or --.

Column 13, line 49, change "applications that relate each of the one or more inventory" to -- applications that relate each of the one or more additional applications to at least one of the one or more inventory --.

Column 14, line 10, change "0p6iable" to -- operable --.

Signed and Sealed this
Twenty-ninth Day of May, 2012

David J. Kappos
*Director of the United States Patent and Trademark Office*